No. 746,177. PATENTED DEC. 8, 1903.
J. O. SCHWEITZER.
PROCESS OF MAKING SUGAR.
APPLICATION FILED JAN. 2, 1902.
NO MODEL.
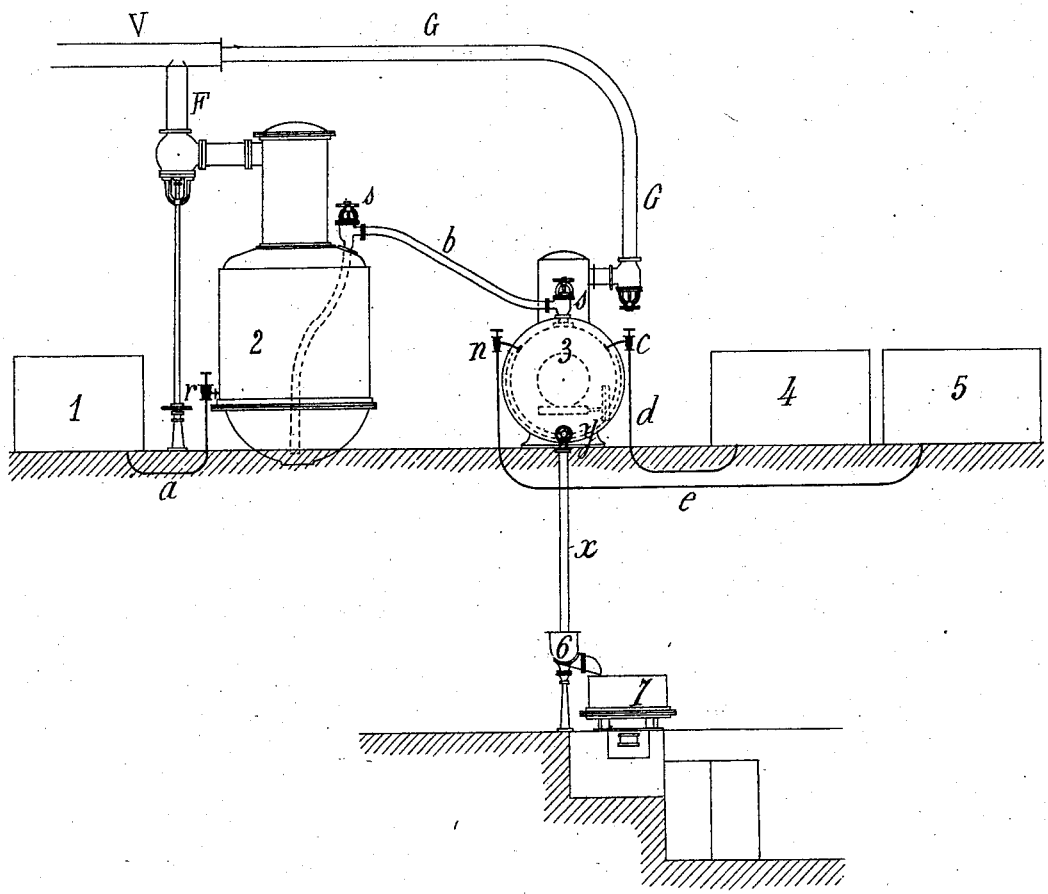
WITNESSES:
INVENTOR.
Jacques Ocipowitch Schweitzer
BY Richards & Co
ATTORNEYS.

No. 746,177.

Patented December 8, 1903.

UNITED STATES PATENT OFFICE.

JACQUES OCIPOWITCH SCHWEITZER, OF PARIS, FRANCE.

PROCESS OF MAKING SUGAR.

SPECIFICATION forming part of Letters Patent No. 746,177, dated December 8, 1903.

Application filed January 2, 1902. Serial No. 88,246. (No specimens.)

*To all whom it may concern:*

Be it known that I, JACQUES OCIPOWITCH SCHWEITZER, of 15 Rue Alphonse de Neuville, Paris, in the Republic of France, have invented certain new and useful Improvements in the Manufacture and Refining of Sugar; and I do hereby declare the following to be a full, clear, and exact description of the invention, such as will enable others skilled in the art to which it appertains to make and use the same.

The invention comprehended in this application refers to improvements in the manufacture and the refining of sugar.

These improvements relate to a particular process for the treatment of masse-cuite from sugar manufacture or refining with the object of increasing the quantity of crystallized sugar of these masses by adding to it a portion of the sugar contained in their mother-liquor of crystallization.

Ordinarily the boiled masses—that is, the syrups derived from the concentration of beet-juice and boiled in the closed kettle to boil to grain *in vacuo*—are treated in centrifugal machines when they leave the boiling apparatus and are delivered therefrom directly into cooling kneading machines or into coolers. Under such conditions the crystallizable sugar contained in the mother-liquor of crystallization of the masse-cuite in a great measure returns to the "syrupy waters"—that is, is led away with the syrups flowing from the turbine and to be treated as low products.

I have conceived the idea of treating the masse-cuite before they enter the centrifugal and immediately when leaving the boiling apparatus, so as to drive again into the so-called "mass" a large portion of the sugar from the mother-liquor of crystallization and to bring the latter into a state by which all the rest of the sugar it keeps after this first treatment may be easily extracted from it.

My process consists, essentially, in kneading the warm masse-cuite when they leave the boiling apparatus with concentrated alcohol and cooling them subsequently, the kneading being done preferably *in vacuo*, though it may be carried out in a closed apparatus. The alcohol when warm dissolves a certain portion of sugar of the mother-liquor of crystallization of the masse-cuite and then allows a portion of this sugar to cool which is superadded to the crystals of the so-called "mass." The masse-cuite, alcoholized and cooled, enriched in sugar, is then introduced in the centrifugal, and the sugar-crystals separate from the alcoholized mother-water. The latter, being then poorer in pure sugar than ordinary molasses from the manufacture and refining of sugar, may be distilled in order to retrieve the alcohol. The settling is a molasses of inferior purity, or, again, instead of distilling directly the alcoholized mother-liquor of crystallization leaving the turbines it can be treated by a milk of lime or by slaked powder-lime, the sugar salt of lime formed being insoluble in alcohol precipitates. Thus the mother-liquor yields all its sugar. The sugar salt is then separated by filtering from the alcoholic residuary syrup, the alcohol of which, as well as the alcohol contained in the sugar salt, is regenerated by distillation.

The apparatus for carrying out the process is illustrated diagrammatically in the accompanying drawing.

In the drawing, 1 is a reservoir containing the syrup from the concentration of beet-juice and communicating by a pipe $a$, provided with a cock $r$, with the boiling apparatus 2 of any desired construction. This boiling apparatus communicates by a conduit F with the empty central pipe V.

3 is a suitable kneading apparatus communicating at its upper part by the pipe G with the empty pipe V. The side of this kneading apparatus communicates, on the one hand, by the conduit $b$ with the boiling apparatus 2, and, on the other hand, by a conduit $e$ with an alcohol-reservoir 5. A conduit $d$ connects also the kneading apparatus with a reservoir 4, containing syrupy waters previously boiled. On the conduits $b$ $d$ $e$ are disposed the cocks $s$ $c$ $n$, respectively. The masse-cuite conveyed by suction into the kneading apparatus is fed with syrupy waters coming from the reservoir 4, not for any indispensable reason, but because it impoverishes the masse-cuite, and so reduces the quantity of alcohol necessary to extract the sugar. When the masse-cuite fills two-fifths or so of the total capacity of the kneading apparatus 3, it is concentrated until it contains not more than about five per cent. of water. Then is shut off the pipe of steam arriving in the double bottom of the kneading apparatus, as well as the communication of the latter with the vacuum. The vacuum in the kneading apparatus 3 allows high-grade alcohol nine and ninety-eight hundredths per cent. to enter into the reservoir 5 in sufficient quantity to liquefy the mass. The cock $n$ is then closed and while keeping on to knead the mixture is cooled by the atmospheric air or artificially by a cold stream of water or other appropriate means until the temperature is reduced to 15° or 20° centigrade, for instance. The mother-liquor of crystallization then loses a large portion of its sugar in behalf of the sugar-crystals from the masse-cuite. To separate the latter from the alcoholized mother-liquor having thus partially yielded its sugar, it is driven through a pipe $x$, the cock $y$ of which is open, into a distributer 6, which is set in action and which carries the mass onto the centrifugals 7.

Naturally the process I have just described applies in a general way to any masse-cuite whatsoever—masse-cuite from manufacture or refining.

I claim as my invention—

The herein-described improvement in the process of manufacturing sugar which consists in kneading warm masse-cuite, immediately upon its leaving the boiling apparatus, with alcohol, cooling the resulting compound, and conveying it to a centrifugal for separation, substantially as described.

In witness whereof I have hereunto set my hand in the presence of two witnesses.

JACQUES OCIPOWITCH SCHWEITZER.

Witnesses:
LOUIS GARDET,
EDWARD P. MACLEAN.